(12) United States Patent
Balachandran et al.

(10) Patent No.: US 10,509,768 B2
(45) Date of Patent: Dec. 17, 2019

(54) METHOD AND SYSTEM FOR SECURE DATA STORAGE AND RETRIEVAL FROM CLOUD BASED SERVICE ENVIRONMENT

(71) Applicants: Bijesh Balachandran, Bangalore (IN); Ranjith Nair, Bangalore (IN)

(72) Inventors: Bijesh Balachandran, Bangalore (IN); Ranjith Nair, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 81 days.

(21) Appl. No.: 14/788,406

(22) Filed: Jun. 30, 2015

(65) Prior Publication Data

US 2017/0004323 A1 Jan. 5, 2017

(51) Int. Cl.
*G06F 16/13* (2019.01)
*G06F 21/62* (2013.01)

(52) U.S. Cl.
CPC .......... *G06F 16/13* (2019.01); *G06F 21/6209* (2013.01)

(58) Field of Classification Search
CPC .. G06F 21/6227; G06F 21/6245; G06F 21/31; G06F 19/322; G06F 17/30091; G06F 17/30106; G06F 8/68; G06F 17/30; G06F 21/10; G06F 21/6209; G06F 16/125; G06F 16/313; G06F 16/22; G06F 16/24; G06F 16/951; G06F 16/9535; G06F 16/245; G06F 16/2228; G06F 16/2423; G06F 16/248; H04L 9/0866; H04L 63/101; H04L 9/0897; G06Q 10/10; G06Q 50/18
See application file for complete search history.

(56) References Cited

U.S. PATENT DOCUMENTS

| | | | | |
|---|---|---|---|---|
| 6,581,072 B1 * | 6/2003 | Mathur | ............... | G06F 16/9535 707/711 |
| 7,451,128 B2 * | 11/2008 | Song | .................. | G06F 17/3048 |
| 7,587,368 B2 * | 9/2009 | Felsher | ................. | G06F 19/322 123/620 |

(Continued)

OTHER PUBLICATIONS

Li, Ming et al., "Authorized Private Keyword Search over Encrypted Data in Cloud Computing", 31st International Conference on Distributed Computing Systems, IEEE, 2011.*

(Continued)

*Primary Examiner* — Thanhnga B Truong
(74) *Attorney, Agent, or Firm* — Lempia Summerfield Katz LLC

(57) ABSTRACT

A method for secure storage of data and retrieval of desired data from a cloud-based service environment includes receiving the data from a tenant having a unique tenant ID, dynamically extracting data to be indexed from the received data, and creating index information from the extracted data. The index information is encrypted with a tenant private key, the encrypted index information is uploaded into the cloud environment in the form of index files, and a last uploaded index file is queried for in the cloud environment. The encrypted index information of the index file is decrypted with the tenant private key, the decrypted index information is searched for a relevant patient record, and the corresponding desired data is retrieved from the cloud environment. The desired data is rendered onto a client application. The index files are created from the index information in chronological order of receipt of the data.

10 Claims, 2 Drawing Sheets

(56) References Cited

U.S. PATENT DOCUMENTS

| | | | | |
|---|---|---|---|---|
| 7,742,414 B1* | 6/2010 | Iannaccone | H04L 43/06 | 370/231 |
| 7,792,789 B2* | 9/2010 | Prahlad | G06F 21/6227 | 707/608 |
| 8,705,714 B2* | 4/2014 | Katis | H04L 12/1831 | 379/88.13 |
| 9,183,303 B1* | 11/2015 | Goel | H04L 67/10 | |
| 9,384,226 B1* | 7/2016 | Goel | G06F 16/9535 | |
| 2004/0172307 A1* | 9/2004 | Gruber | G06Q 50/24 | 705/3 |
| 2006/0041533 A1* | 2/2006 | Koyfman | G06F 17/30312 | |
| 2009/0300351 A1* | 12/2009 | Lei | G06F 17/30864 | 713/165 |
| 2010/0262545 A1* | 10/2010 | Herlitz | G06Q 10/00 | 705/51 |
| 2011/0093471 A1* | 4/2011 | Brockway | G06F 17/30616 | 707/747 |
| 2012/0078869 A1* | 3/2012 | Bellville | G06F 16/90 | 707/706 |
| 2012/0158432 A1* | 6/2012 | Jain | G06Q 10/10 | 705/3 |
| 2013/0096943 A1* | 4/2013 | Carey | G06F 19/366 | 705/2 |
| 2013/0254539 A1 | 9/2013 | Auradkar et al. | | |
| 2014/0357972 A1* | 12/2014 | Meng | H04L 67/10 | 600/365 |
| 2015/0310058 A1* | 10/2015 | Kraft | G06F 17/30864 | 707/758 |
| 2015/0356314 A1* | 12/2015 | Kumar | G06F 17/30336 | 713/165 |

OTHER PUBLICATIONS

"Practical Techniques for Searches on Encrypted Data," written by Dawn Xiaodong Song, David Wagner and Adrian Perrigo, pp. 1-2, 2011.

Song et al., "Practical Techniques for Searches on Encrypted Data", IEEE, pp. 1-12, May 14-17, 2000.

* cited by examiner

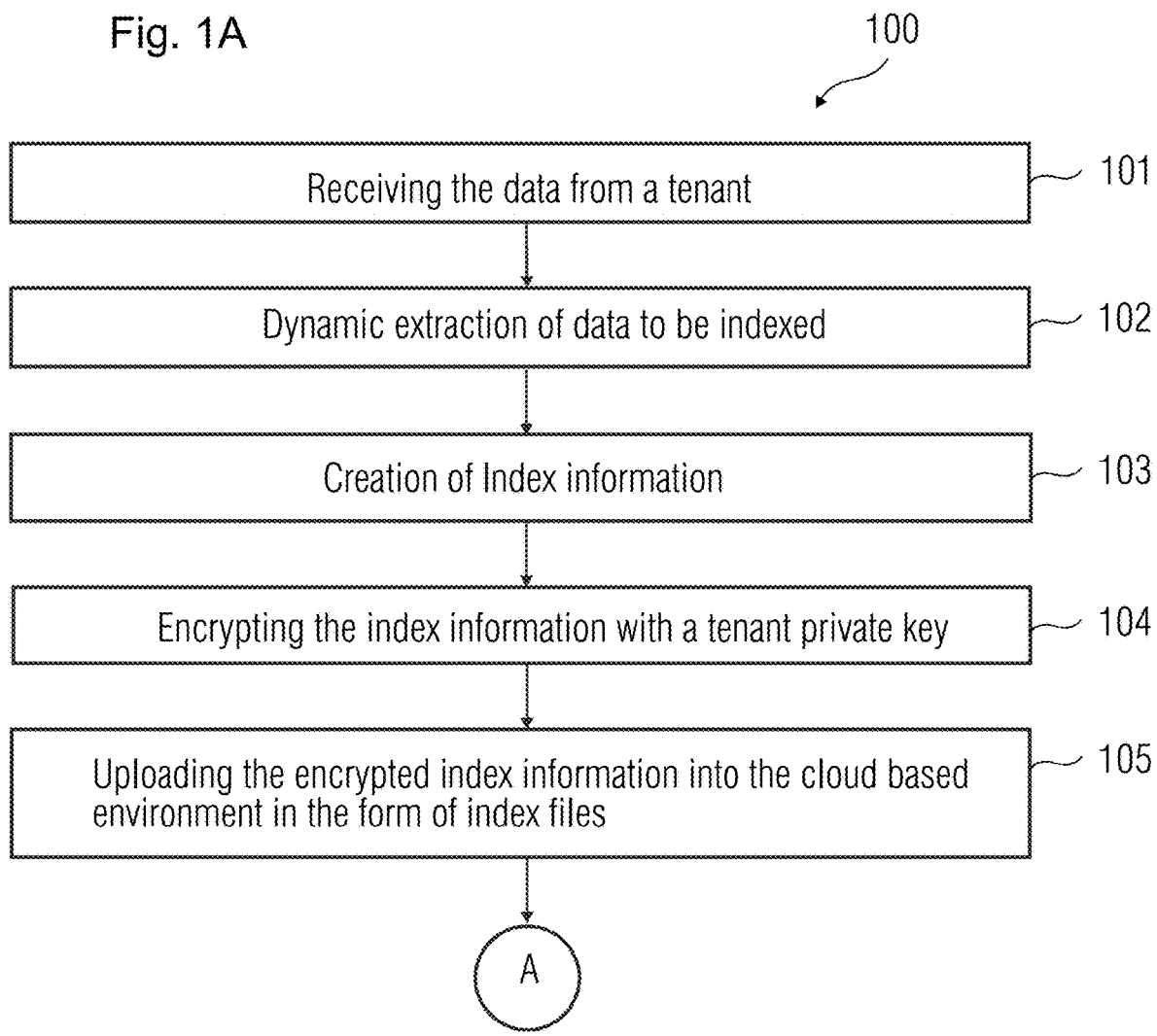

METHOD AND SYSTEM FOR SECURE DATA STORAGE AND RETRIEVAL FROM CLOUD BASED SERVICE ENVIRONMENT

FIELD OF TECHNOLOGY

The present embodiments generally relate to the field of secure data storage in cloud environment.

BACKGROUND

Patient data privacy is one of the primary concerns in the health care domain, and this is more significant in a cloud scenario, where Protected Health Information (PHI) data may be continuously uploaded to the cloud environment, which is in the public domain. Since the data from various tenants or hospital environments are stored in the cloud centrally, the volume of data is extremely large and may easily run into peta-bytes of data. Typically, such upload of data from hospital environment to the cloud is governed by availability of internet connection and suitable bandwidth.

Apart from maintaining the privacy of the PHI data, the PHI data in a multi-tenant environment is to be isolated. When there are several hospital environments storing their data on a single cloud based service provider, each of the tenants is to have data maintained in an isolated form without compromising on security. This forms an important tenet in the cloud paradigm.

A standard approach is to encrypt the data before the data is stored in the cloud with private keys of the tenants or the owner of the data, such that the data on the cloud may not be decrypted. This solves the security concerns. This, however, brings up a new problem of searching in such encrypted data, without decrypting the encrypted data on the cloud. Another problem that is commonly faced is during unavailability of a network connection. In such scenarios, there is interruption in the uploading of data, as the uploading of data is deferred and cached until the network connection is restored. This causes delay and disruption in normal functioning of the system.

In typical medical applications in a cloud scenario, the client may be a web browser. A typical approach for solving the above mentioned problems would be to download the complete encrypted data on to the client, then decrypting the encrypted data using a private key of the tenant and searching in this decrypted data. In a cloud scenario of the volume of data being large, this approach is not practical, as the time to download the data on to the client side would be quite large. Also, as the cryptography is asymmetric, the time taken to decrypt is also very high. Another approach is to perform the search on the cloud itself. However, since the data in this context is encrypted and the encrypted data may not be decrypted in the cloud, this option is also not feasible. There are some other solutions based on searchable encryption. However, the other solutions tend to be more vulnerable, as the security of the encrypted data is compromised.

The published paper titled "Secure Search for Massive, Public Cloud Hosted Medical Data Volumes" is relevant for this disclosure. The focus of this published article is on the way in which multi-level index is employed to solve the issue of very large data set searching, where the data being searched is coming from various entities. The index is divided based on the individual field that is being indexed and the focus is on multi-level indexing. This uses multiple roundtrips for a single search operation and involves additional decryption overhead. Also, multiple read operations are to be performed to index one record. As this solution makes use of hierarchical index structures, individual data upload is to read and update multiple buckets or index list or both. This is relatively more complex and results in poorer performance, as there is slow update of the index.

In the above prior art disclosure, the index is divided based on the alphabetical range. This makes the index complex as such a division of index leads to performance and concurrency issues during index update where merging of multiple indexes when new or incremental indexes arrive from multiple clients is to be handled.

Another relevant article related to this field is written by Ming Li, Shucheng Yu, Ning Cao and Wenjing Lou, titled "Authorized Private Keyword Search over Encrypted Personal Health Records in Cloud Computing." This article addresses the problem of authorized private keyword searches on encrypted patient health records in cloud computing environments. The article discloses a scalable and fine-grained authorization framework for searching on encrypted patient health records, where users obtain query capabilities from localized trusted authorities according to attributes, which is highly scalable with the user scale of the system. This article mainly describes authorization and privacy control mechanism for query search using searchable encryption.

Another relevant publication related to the field of searchable encryption is titled "Practical Techniques for Searches on Encrypted Data," written by Dawn Xiaodong Song, David Wagner and Adrian Perrig. The publication addresses the problem of searching on encrypted data and providing proofs of security for the resulting crypto systems. The publication discloses a technique for remote searching on encrypted data using an untrusted server.

Prior art US 2009/0300351 A1 discloses a method, apparatus and system for fast searchable encryption. The data owner encrypts and stores the cipher text to the server. The data owner generates an encrypted index according to each keyword of the files and stores the encrypted index to the server. This disclosure provides formation of keyword or file specific indexes and related keys to use for distribution to different roles.

Prior art US 2013/0254539 A1 also provides searchable encryption techniques for obscuring data stored at remote site or in a cloud service, distributing trust across multiple entities to avoid a single point of data compromise.

SUMMARY AND DESCRIPTION

The scope of the present invention is defined solely by the appended claims and is not affected to any degree by the statements within this summary.

None of the above cited prior art explicitly discusses the problem that arises in a situation when the network connection is down or in case the Internet connection is not available. In such a situation, the data will not get updated or uploaded, and there will be a downtime needed to fix the issue.

An easy, simple, fast index generation technique for searching for relevant data in a secured manner in encrypted protected health information without compromising on the security of the information is to be provided. At the same time, a drop in Internet or network connectivity is not to create any disturbance in the workflow or generate a need for a downtime to resume where the operation was halted. Seamless operation of data uploading and retrieval without getting affected by a network or Internet connection drop is to be provided. None of the existing prior arts disclose any technique that provides a seamless and disturbance-free operation unaffected by network connectivity without compromising on the security of the PHI.

A simple, secure and time saving method for performing efficient search on encrypted data without impacting the continuous data upload scenario is to be provided.

The present embodiments may obviate one or more of the drawbacks or limitations in the related art. For example, a simple, secure and time saving method and system for performing efficient search on encrypted data without impacting continuous uploading of data in the event of unavailability of network connection to the cloud environment are provided.

A method and a system for secure storage of data and retrieval of desired data from a cloud based service environment are disclosed. According to one embodiment, a method for secure storage of data and retrieval of desired data from a cloud based service environment includes receiving the data from a tenant having a unique tenant ID, dynamic extraction of data to be indexed from the received data, creation of index information from the extracted data, and encrypting the index information with a tenant private key at the tenant side or the hospital environment. The method also includes uploading the encrypted index information into a cloud based service environment in the form of index files. The next set of acts are executed at the client application or at the browser and includes: querying for the last uploaded index file in the cloud environment; decrypting the encrypted index information of the index file with the tenant private key; searching the decrypted index information for a relevant patient record and retrieving the desired data from the cloud based service environment; and rendering the desired data on to the client application. The index files are created from the index information in chronological order of receipt of the data. In case the relevant patient record is not found in the last uploaded index file, then the index file uploaded before the previously searched index file is queried from the cloud based service environment and so on until the relevant patient record is found. The act of rendering the desired data on to the client application then takes place.

A typical use case is where the user is mostly interested in the most recent data, where most of the searches revolve around the most recently uploaded data. The method disclosed herein facilitates the storage of the index information in chronological order of time and makes the proposed approach feasible.

In one embodiment of the method, the data is protected health information. Protected health information (PHI) is any information that identifies or may readily be associated with the identity of a patient. PHI includes information related to the status of health of a patient, provision of health care, personal details about the patient, or payment for health care that may be linked to a specific individual. PHI also includes any part of a patient's medical record or payment history. Protected health information is confidential data, and all hospitals are to exercise caution in handling and protecting the privacy of such data.

In another embodiment, the index files are created specific to the tenants (e.g., all the index information stored in a single index file belongs to the same tenant). Each tenant may have several such index files. This helps in data isolation in multi-tenancy environments.

In an embodiment of the present method, each index file is time stamped. The index files are created in a sequential order of receipt of data, and each file contains information about the date and time of creation of the index file or in the alternative, the date and time of receipt of the data. The advantage of time stamping the index files with date and time is that the data may be easily uploaded sequentially without having to wait for the exact index file that matches a certain predefined criteria (e.g., alphabetical criteria for index creation). In most cases, the desired data is one of the most recent data. Therefore, the retrieval of the desired data is also easier and faster, as only the last few index files only are searched to get the desired data. This is made possible by use of the time stamp information of the index files. The time stamp information may also include the date on which the index file was created. Thus, with this feature, the index files may be chronologically stored, and the latest index files may be retrieved first.

In another embodiment of the method, the act of creation of the index information occurs in an offline state. When the network is unavailable, the data may still continue to be received, the index information may still continue to be created, and index files may still continue to be formed, as the index information creation and index file formation does not depend on existing index data that is available in the cloud. The index information is created in an incremental manner, and the index files are chronologically formed. In other words, when the index information is created at the tenant site and if the network connection to the cloud based service environment is down, the index file is not uploaded immediately. Once when the network connection has been restored, the incremental index information in the index files may then be uploaded from the tenant site on to the cloud based service environment. As there is no downtime needed for index creation and uploading of the index files, this helps in providing a seamless, disturbance-free functionality to the method. This works on the lines of caching data when no connection is available and later uploading the cached data when the Internet connection is available again.

According to yet another embodiment, even in the presence of Internet connectivity, the index information is not always uploaded immediately. Rather, the index information is collected in the index files like in a bucket until a threshold is reached. Then, the index files acting as a bucket of index information is uploaded. This gathering of data until the reaching of the threshold, which may be some point in time or based on size of the file, and then uploading onto the cloud based service environment avoids frequent round trips for processor and saves network bandwidth. In yet another embodiment of the method, the acts of creation of the index information further includes compressing the index information. This would reduce the size of the index information and thus make the transfer of the index information to the cloud based service environment faster over the network. Also, the decryption of the compressed index information is faster as compared to decryption of uncompressed index information. In another embodiment, the PHI data is also compressed for saving space and reducing network traffic. While compressing the PHI data, the information related to date and time of origin of the PHI data is to also be conserved so that the index files may be created from the index information in chronological order of receipt of the PHI data.

In another embodiment, the index information includes fields related to patient identification. The index information does not possess all the fields of the data but only the important fields that are crucial in identification of a particular patient data. In other words, the information in the index information is a subset of the information present in the data to make the index files smaller in size. In an exemplary embodiment, the index information includes the patient name, age, date of entry, and disease diagnosed. The index information may include other fields also depending on the requirement.

In an embodiment of the method, the index file has a flat file structure. Having a flat file structure gives a non-complex structure to the index files that may then be conveniently stored and easily searched.

In another embodiment of the method, the corresponding desired data is retrieved from the cloud based service environment using a serial number. As the index data includes mainly the searchable fields only, there is a need to map this index with the actual patient record. This is achieved by generating a serial number to uniquely identify the patient record and to include this in the index. With the help of this serial number, the exact patient record or the desired data may be identified and retrieved from the data stored on the cloud corresponding to the matched index information.

In another embodiment of the method, every tenant has a unique tenant ID. Also, while uploading the data at the receiver module, the information about the tenant in the form of tenant ID may also be uploaded. This will be useful for identifying the origin or source of all the uploaded data.

In an embodiment of the system for secure storage of data and retrieval of desired data from a cloud based service environment, the system includes a receiver module for receiving data from a tenant. The receiver module resides at the tenant site. The system also includes a processor for creating index information from the data and encrypting the index information with a tenant private key, a cloud based service environment for storing the data and the encrypted index information, and a client application for querying, decrypting, retrieving and rendering the desired data to the client.

According to an embodiment of the system, the client application runs on a web browser. The web browser provides the necessary user interface to the user to view the desired result or to modify desired result based on the need. In another embodiment, the client application is a standalone application.

According to an embodiment of the system, the index file is generated on the tenant side in the receiving module itself in a memory unit, rather than on the cloud based service environment, providing security of the data. The index information is bagged into index files before uploading onto the cloud based service environment. The generated index information is incremental and works well even if the network connectivity with the cloud based service environment is unavailable. Once the network connection is restored, the incremental index information may be directly pushed on to the cloud based service environment without additional overhead. According to another embodiment of the system, the client application has a cache memory. This cache memory is useful for temporarily storing the decrypted index information from the index files or the information retrieved at the end of a data retrieval operation. The desired data thus stored may further be operated upon before presenting to the end user if necessary.

This summary is provided to introduce a selection of concepts in a simplified form that are further described below in the following description. This summary is not intended to identify features or essential features of the claimed subject matter. The claimed subject matter is not limited to implementations that solve any or all disadvantages noted in any part of this disclosure.

BRIEF DESCRIPTION OF THE VIEWS OF THE DRAWINGS

A more complete appreciation of the present disclosure and many of the attendant aspects thereof will be readily obtained as the same becomes better understood by reference to the following detailed description when considered in connection with the accompanying drawings:

FIGS. 1A and 1B schematically represent an embodiment of a method for secure data storage and retrieval from a cloud based service environment; and FIG. 2 illustrates a block diagram of a system for secure data storage and retrieval from a cloud based service environment according to an embodiment.

DETAILED DESCRIPTION

Figure 1B:
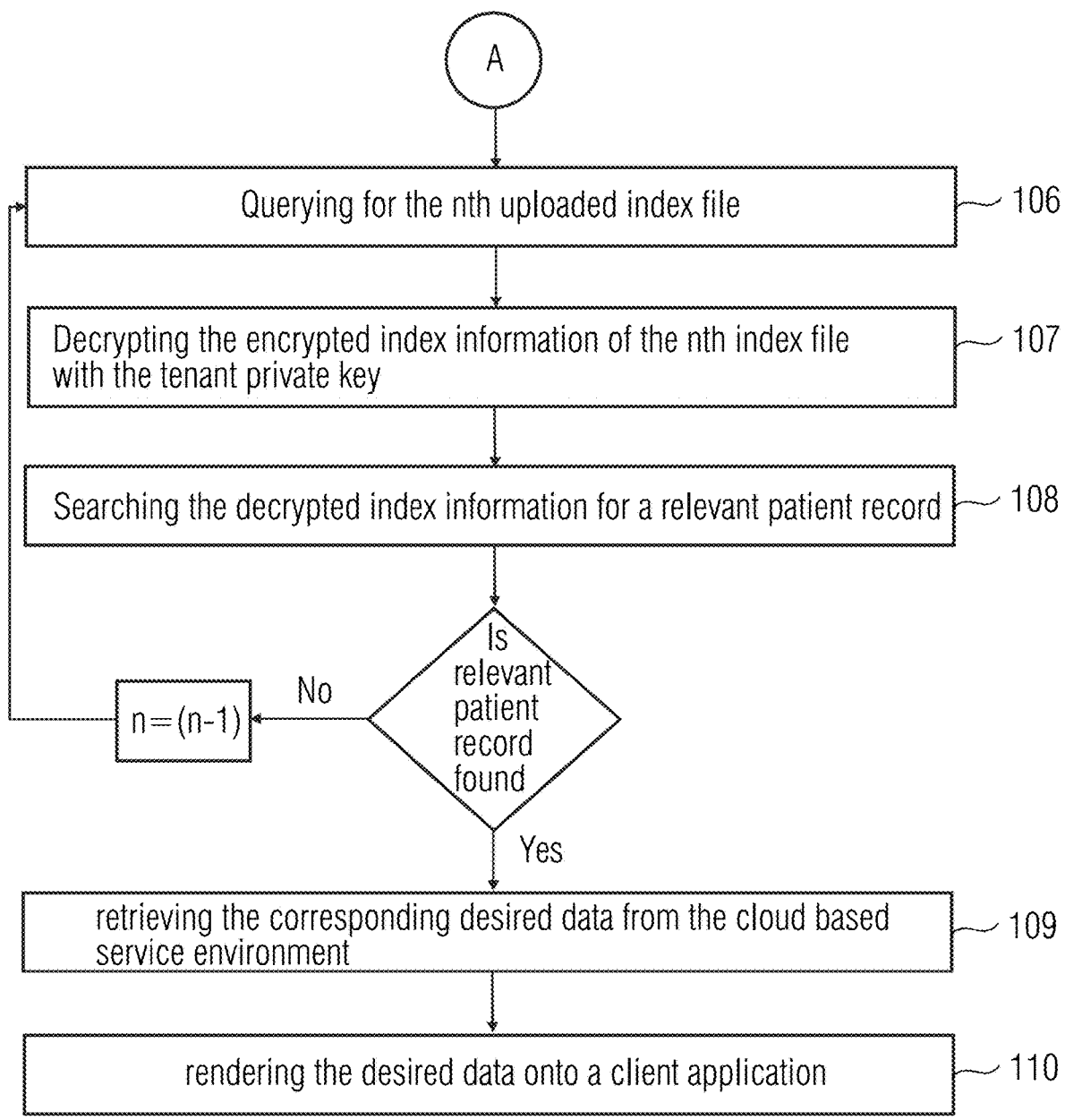

A method 100 and a system 200 for secure storage of data 1 and retrieval of desired data 2 from a cloud based service environment 3 are provided. Various embodiments are described with reference to the drawings, where like reference numerals are used in reference to the drawings to refer to like elements throughout. In the following description, numerous specific details are set forth in order to provide thorough understanding of embodiments. These specific details, however, need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is, however, no intent to limit the disclosure to the particular forms disclosed. On the contrary, the disclosure is to cover all modifications, equivalents, and alternatives falling within the spirit and scope of the present disclosure.

FIGS. 1A and 1B illustrate a flowchart depicting the various acts of one embodiment of a method 100 to be carried out for secure storage of data 1 and retrieval of desired data 2 from a cloud based service environment 3. The method 100 includes act 101 of receiving the data 1 from at least one tenant 4. Act 102 includes dynamic extraction of data to be indexed from the received data 1. Act 103 involves creation of index information 6 from the extracted data. Act 104 includes encrypting the index information 6 with a tenant private key 7. In act 105, uploading of the encrypted index information into the cloud based service environment 3 in the form of index files 8 takes place. In act 106, querying for the last uploaded index file 8 from the cloud based service environment 3 takes place. Act 107 involves decrypting the encrypted index information of the index file 8 with the tenant private key 7. Act 108 includes searching the decrypted index information 6 for a relevant patient record, and act 109 includes retrieving the corresponding desired data 2 from the cloud based service environment 3.

If the relevant patient record is not found in the last ($n^{th}$) uploaded index file 8 that was searched, then the index file $((n-1)^{th})$ 8 uploaded immediately before the previously searched index file 8 ($n^{th}$) is queried and so forth until the relevant patient record is found. Once the relevant patient record is found, the act 109 of retrieving the corresponding desired data 2 from the cloud based service environment 3 is carried out.

Act 109 includes rendering the desired data 2 on to a client application 9. In the method 100 as disclosed herein, the index files 8 are created from the index information 6 in chronological order of receipt of the data 1.

Every participating hospital or imaging center, referred to as a tenant 4 in this disclosure, using this method 100 will be identified in the system by a unique tenant ID 5 (i.e., a tenant identification number that is unique for each tenant 4).

According to the method 100, the processor 11 in the receiver module 10 creates the index information 6 in act 103 from the data 1 that gets uploaded from the tenant 4 side. The receiver module 10 dynamically extracts the index data in act 102 from the data 1 that is being uploaded. This is possible because the data being uploaded is in a non-encrypted state. The receiver module 10 runs in the hospital or the tenant premise, and the tenant 4 being the owner of the data 1 has full access to the data 1. The data 1 is thus in the unencrypted form. In an exemplary embodiment, the data 1 includes fields such as year, name, description, modality, sex and identification number of a patient.

The processor 11 in the receiver module 10 creates the index information 6 in the chronological order of the data 1 that is received by the receiver module 10. The volume of index information 6 is an insignificant fraction of the actual volume of data 1.

According to an embodiment, the act 103 of creation of the index information 6 further includes compression of the received data 1. The processor 11 in the receiver module 10 encrypts the index information 6 in act 104 with the tenant private key 7 of the hospital or the tenant 4 and sends the same to the cloud based service environment 3.

The act 105 of uploading the data 1 need not be performed every time a new patent is registered with the tenant 4. This may be optimized (e.g., per hour, every ten patients, or some other criteria deemed suitable). Also, when the network is unavailable, the receiver module 10 may still continue operations through the processor 11 and carry on with the creation of index files 8, as the index information 6 creation does not depend on the existing index files 8 that are available on the cloud based service environment 3. Rather, the index information 6 has a flat structure and is based on the time information of acceptance of the data 1 at the receive module 10. Therefore, the unavailability of the network connection does not hamper the process of creation of index files 8.

Once the encrypted index information 6 in the form of index files 8 are uploaded onto the cloud based service environment 3 according to act 105, the encrypted index files 8 are stored and are further indexed by the Tenant ID 5 to facilitate quick lookup of the index files 8. As mentioned earlier, each tenant 4 or hospital is recognized by a unique tenant ID 5.

The index files 8 have date-time information or have a time stamp so that the data of the index files 8 may be chronologically stored, and the latest information may be retrieved first.

In an exemplary embodiment on the client application 9 side (e.g., on a browser), the client application 9 queries the cloud based service environment 3 for the latest index file 8 for a specified tenant 4 having a unique tenant ID 5. The cloud based service environment 3 returns the encrypted index file 8 for the specified tenant 4.

The client application 9 decrypts the encrypted index file 8 using the tenants private key 7. The client application 9 additionally uncompresses the compressed index file 8 if the index file 8 was compressed by the processor 11 in the receiver module 10. Once decrypted, the index information 6 is a searchable index, and the index information 6 may be locally stored in the client application 9 temporarily on the cache memory 12 and destroyed on closure of the result. In act 108, a search is carried out on the decrypted index information 6, and this search result is used to identify and fetch the corresponding information of the actual patient record for the unique tenant ID 5 (e.g., the desired data 2) from the cloud based service environment 3. The decrypted index information 6 contains a serial number that helps to identify the corresponding actual patient data or record in the cloud based service environment 3.

If the desired data 2 is not available in the index information 6 retrieved from the latest in time index file 8, then subsequently, the index file 8 created immediately before the latest in time index file 8 is fetched. Then, similar to the earlier act, again the index information 6 is used to identify the correct patient data entry in the cloud based service environment 3. Thus, the desired data 2 is retrieved and rendered for viewing for the user on the client application 9. In this manner, the index files 8 are searched until a match is found.

In specific environments, like in hospital environments, most of the searches are targeted at the most recent data, the probability of finding a hit in the first few buckets or index files 8 are quite high.

FIG. 2 illustrates a block diagram of a system 200 for carrying out the method 100 for secure storage of data 1 and retrieval of desired data 2 from a cloud based service environment 3 according to one embodiment. According to FIG. 2, the system 200 includes a receiver module 10, a processor 11, a cloud based service environment 3, and a client application 9.

The receiver module 10 continuously uploads the data 1 received from the tenant 4 to the cloud based service environment 3. The receiver module 10 has full access to the data 1, as the data is in the unencrypted form at this stage. The receiver module is also capable of working in the offline mode when the network in not available, and a connection may not be set up with the cloud based service environment. During such offline mode of operation, the receiver module 10 uses the memory unit 13 for storing the incremental index information 6 created. Later, when the connection is restored, the index information 6 is put into index files 8 and uploaded onto the cloud based service environments 3 for secure storage as in encrypted form.

To save network bandwidth and to avoid frequent round trips for the processor 11 when the network connection is available for uploading index information 6, the index information 6 is collected in the index files 8 until a threshold is reached, and then, the index files 8 acting as a bucket of index information 6 is uploaded onto the cloud based service environment 3. The threshold may be a time period as set by the tenant 4 or based on a predefined size of the index file 8.

The processor 11, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. Processor 11 may also include embedded controllers, such as generic or programmable logic devices or arrays, application specific integrated circuits, single-chip computers, and the like.

The cloud based service environment 3 receives the data 1 from the receiver module 10 and stores the data 1 in a protected form. A typical cloud based service environment 3 may offer free, personal, and/or business accounts providing hundreds or more of petabytes of online storage. Storage of data on a cloud environment provides high fault tolerance in the data via redundancy and/or distribution of data and provides high durability. Some exemplary cloud based service environments or service providers include, but are not limited to, Dropbox, Google Drive, Amazon Web Services, and Microsoft Azure. The data 1 may be retrieved from the cloud based service environment 3 and exposed on rendered on to the client application 9 for viewing. The client application 9 runs on a web browser and facilitates end users of the system 200 to view and manipulate the desired data 2. The client application 9 has a cache memory 13 for temporarily storing the decrypted index information 6 from the index files 8 or for storing the desired data 2.

It is to be understood that the system and methods described herein may be implemented in various forms of hardware, software, firmware, special purpose processors, or a combination thereof. One or more of the present embodiments may take a form of a computer program product (e.g., a non-transitory computer-readable storage medium) including program modules accessible from computer-usable or computer-readable medium storing program code for use by or in connection with one or more computers, processors, or instruction execution system.

While the present disclosure has been described in detail with reference to certain embodiments, it should be appreciated that the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

What is claimed is:

1. A method for secure storage of data and retrieval of desired data from a cloud based service environment, the method comprising:
   receiving the data from at least one tenant;
   dynamically extracting data to be indexed from the received data;
   creating, by a microprocessor of the at least one tenant, index information comprising fields related to patient identification from the extracted data independent of further index information stored in the cloud based service environment and in an offline state where a network connection is not available between the microprocessor of the at least one tenant and the cloud based service environment;
   encrypting the index information with a tenant private key;
   uploading the encrypted index information into the cloud based service environment in the form of index files, wherein each index file is tenant specific, wherein the index file has a threshold, and wherein the threshold comprises at least one of a time period as set by the tenant and a predefined size of the index file;
   querying, by a client application residing at a client device, for a last uploaded index file from the cloud based service environment;
   decrypting the encrypted index information of the index file with the tenant private key;
   searching the decrypted index information for a relevant patient record;
   when the relevant patient record is not found, querying for an index file uploaded before the previously searched index file from the cloud based service environment until the relevant patient record is found;
   retrieving the corresponding desired data from the cloud based service environment; and
   rendering the desired data on to a client application,
   wherein the index files are created from the index information in chronological order of receipt of the data.

2. The method of claim 1, wherein the data is protected health information.

3. The method of claim 1, wherein each index file is time stamped.

4. The method of claim 1, wherein the creating of the index information comprises compressing the index information.

5. The method of claim 1, wherein the index file has a flat file structure.

6. The method of claim 1, wherein the corresponding desired data is retrieved from the cloud based service environment using a serial number.

7. The method of claim 1, wherein the tenant has a unique tenant ID.

8. A system for secure storage of data and retrieval of desired data from a cloud based service environment, the system comprising:
   a receiver module of a tenant, wherein the receiver module comprises:
      a microprocessor; and
      a memory coupled to the microprocessor, wherein the microprocessor and the memory are configured to cause the receiver module to:
         receive data from the tenant;
         create index information comprising fields related to patient identification from the data independent of further index information stored in the cloud based service environment, wherein the creation of the index information occurs in an offline state where a network connection is not available between the receiver module of the tenant and the cloud based service environment;
         encrypt the index information with a tenant private key; and
         upload the encrypted index information into a cloud based service environment in the form of index files, wherein each index file is tenant specific, wherein the index file has a threshold, wherein the threshold comprises at least one of a time period as set by the tenant and a predefined size of the index file, and wherein the cloud based service environment is configured to store the data and the encrypted index information; and
   a client application residing on a client device configured to query, decrypt, retrieve and render the data.

9. The system of claim 8, wherein the client application runs on a web browser.

10. The system of claim 8, wherein the client application comprises a cache memory.

* * * * *